US 7,699,918 B2

(12) United States Patent
Odell et al.

(10) Patent No.: US 7,699,918 B2
(45) Date of Patent: Apr. 20, 2010

(54) REACTIVE INK COMPONENTS AND METHODS FOR FORMING IMAGES USING REACTIVE INKS

(75) Inventors: Peter G. Odell, Mississauga (CA); Emily L. Moore, Mississauga (CA); Jennifer L. Belelie, Oakville (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 400 days.

(21) Appl. No.: 11/756,164

(22) Filed: May 31, 2007

(65) Prior Publication Data

US 2008/0295731 A1 Dec. 4, 2008

(51) Int. Cl.
*C09D 11/02* (2006.01)
(52) U.S. Cl. ..................... 106/31.13; 347/100
(58) Field of Classification Search ................. 347/100, 347/101; 106/31.13, 31.27, 31.6
See application file for complete search history.

(56) References Cited

U.S. PATENT DOCUMENTS

| 5,354,840 | A | 10/1994 | Odell |
| 5,372,852 | A | 12/1994 | Titterington et al. |
| 5,380,769 | A | 1/1995 | Titterington et al. |
| 5,645,888 | A | 7/1997 | Titterington et al. |
| 5,958,169 | A | 9/1999 | Titterington et al. |
| 6,114,076 | A | 9/2000 | Odell et al. |
| 6,547,380 | B2 | 4/2003 | Smith et al. |
| 6,663,703 | B1 | 12/2003 | Wu et al. |
| 6,726,755 | B2 | 4/2004 | Titterington et al. |
| 6,821,327 | B2 | 11/2004 | Jaeger et al. |
| 6,835,238 | B1 | 12/2004 | Wu et al. |
| 6,860,931 | B2 | 3/2005 | Wu et al. |
| 6,958,406 | B2 | 10/2005 | Banning et al. |
| 2005/0014005 | A1* | 1/2005 | Kramer et al. ............... 428/413 |

OTHER PUBLICATIONS

U.S. Patent Application No. 11/290,122, filed Nov. 3, 2005.
U.S. Patent Application No. 11/290,328, filed Nov. 30, 2005.
U.S. Patent Application No. 11/427,172, filed Jun. 28, 2006.
Horner, "Zur Umsetzung von Diacylperoxyden mit tertiären Aminen", J, Polym., vol. 18, 1955, pp. 438-439.
Feng et al., "The Role of Amine in Vinyl Radical Polymerization", Makromol. Chem., Macromol, Symp., vol. 63, 1992, pp. 1-18.
G. Moad et al., "The Reaction of Acyl Peroxides with 2,2,6,6-tetramethylpiperidinyl-1-oxy", Tetrahedron Letters, vol. 22, 1982, pp. 1165-1168.

* cited by examiner

*Primary Examiner*—Matthew Luu
*Assistant Examiner*—Rut Patel
(74) *Attorney, Agent, or Firm*—Oliff & Berridge, PLC

(57) ABSTRACT

A reactive ink set including three mixtures of radically polymerizable monomers. A first mixture includes a peroxide, a second mixture includes a peroxide decomposition agent, and an optional third mixture that does not include a peroxide or a peroxide decomposition agent. The first mixture and the second mixture polymerize to form a solid ink on the substrate following jetting in the liquid state.

19 Claims, No Drawings

REACTIVE INK COMPONENTS AND METHODS FOR FORMING IMAGES USING REACTIVE INKS

Described herein are reactive ink components and methods for mixing the reactive ink components in forming a permanent image on an image receiving substrate. The reactive ink components may be combined or mixed together before or during jetting onto the substrate, or on a substrate after jetting, to initiate a reaction of a binder to form an image on the surface of the substrate. The reactive ink components are suitable for ink jet printing processes, particularly piezoelectric ink jet printing processes or the like. The reactive ink components may include a first component including a peroxide and a second component including a peroxide decomposition agent that reacts with the first component, for example, by an oxidation/reduction reaction (hereinafter "redox reaction") between the reactive ink components. Upon mixing of the ink components, the reaction of the binder takes place to form a hard, solid ink.

Further inclusion of an inhibitor allows control over the reaction rate and time, for example by providing an induction period for the redox reaction to prevent reactivity of the reactive ink components within channels of an ink jet device prior to jetting the reactive ink components from an ink jet head of the ink jet device. A purge ink may remove residual radicals from mixing or jetting of the reactive ink components. The purge ink may include free radical trap agents to remove the residual radicals.

REFERENCES

Ink jetting devices are known in the art, and thus extensive description of such devices is not required herein. As described in U.S. Pat. No. 6,547,380, incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets.

The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference in its entirety, the image is applied by jetting appropriately colored inks during four to six rotations (incremental movements) of a substrate (an image receiving member or intermediate transfer member) with respect to the ink jetting head, that is, there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Conventional phase change hot melt inks typically used with ink jet printers of the aforementioned type frequently utilize a wax based ink vehicle, for example, a crystalline wax. Wax based irks may be used in piezoelectric ink jet printers to provide visual pleasing images at low cost in an office environment. However, broadening the application of piezoelectric ink jet devices in some applications may require a more robust image than the wax inks may readily attain.

U.S. Pat. No. 5,354,840, the disclosure of which is totally incorporated herein by reference, discloses functional-amine polyesters having at least a first residue of a first monomer, a second residue of a second monomer and from about 0.1 to about 3.0 mole percent of a functional-amine residue of a functional amine prepared by reacting the first and second monomers and the functional amine in an inert atmosphere. The functional amine has a functional group which facilitates polymerizing the amine and the first and second monomers. The amine residue facilitates reaction of the functional-amine polyester in an organic peroxide cross-linking reaction system.

U.S. Pat. Nos. 5,380,769, 5,645,888 and 5,958,169, the disclosures of which are totally incorporated herein by reference, disclose reactive ink compositions that utilize at least two reactive components, a base ink component and a curing component, that are applied to a receiving substrate separately. The base ink component includes an ink carrier, a compatible colorant, and a cross-linkable constituent, and the curing component is a cross-linking agent. Upon exposure of the base ink component to the curing component, at least a portion of the ink is cross-linked to provide a printed image that is durable and abrasion-resistant.

U.S. Pat. No. 6,114,076, the disclosure of which is totally incorporated herein by reference, discloses a reactive melt mixing process for the preparation of a low fix temperature toner resin. The process includes (a) mixing a reactive base resin, an initiator, and a polyester with amine functionality, and (b) crosslinking the resulting polymer melt under high shear to form a crosslinked toner resin.

U.S. patent application Ser. Nos. 11/290,122 and 11/290,328, incorporated herein by reference in its entirety, disclose ultraviolet curable compounds that are soluble in phase change ink carriers that can be incorporated into the phase change ink without adversely affecting the viscosity characteristics of the ink at desired jetting temperatures. The ultraviolet curable compounds may be first jetted onto an intermediate transfer member and subsequently transferred from the transfer member to a final substrate, such as paper or transparency material.

U.S. patent application Ser. No. 11/427,172, incorporated herein by reference in its entirety, discloses a radiation curable phase change ink comprising an ink vehicle that includes at least one curable carrier, at least one gellant, at least one curable wax and at least one photoinitiator. In a method of forming an image with the ink, the radiation curable phase change ink is melted, then jetted onto an image receiving substrate, wherein the radiation curable phase change ink forms a gel state, and exposed to ultraviolet light to cure the curable components of the radiation curable phase change ink. The wax cures into the structure of the ink, thereby generating a robust image of excellent gloss.

BACKGROUND

Current solid ink jet formulations, typically, provide prints that are vibrant and allow for printers that are reliable and affordable. However, prints formed with current solid ink jet formations that are wax based images tend not to be robust and are often scratched or marred by stress applied to the images. Piezoelectric ink jet (hereinafter "PIJ") printing processes that utilize ultraviolet (hereinafter "UV") inks to form extremely robust images. However, these UV inks require bulky, complex and expensive UV light curing stations or expensive photoinitiators to cure the images or to fix the images onto a surface of the substrate. The known reactive inks require exposure to e-beam radiation in to be cured. E-beam curable inks are more expensive still, for example, about ten times as costly as a UV lamp system and require effective shielding.

A need, therefore, exists for a reactive ink system and methods for forming images using the same that provides images that are robust and do not scratch or mar when stress is applied thereon. Further, a need exists for a reactive ink system and methods for forming images using the same that provides robust images that are inexpensive and efficiently produce images.

SUMMARY

In embodiments, described is a reactive ink system comprised of at least a first ink and a second ink, wherein the first ink contains a first reactive component and the second ink includes a second reactive component, the first and second reactive components react when mixed together. Upon being combined together, the first and second iris initiate a reaction of a binder of the first and the second inks to form robust ink images on a substrate onto which the inks are jetted. The reactive inks may be combined together before or during jetting onto the substrate or on the substrate after jetting. The ink components may react by a rapid, predictable and controllable reaction. For example, a redox reaction between a peroxide agent within the first ink and a peroxide decomposition agent in the second ink mixture may be used. The first ink, the second ink and optionally third ink may also include an inhibitor to provide an induction period to the reaction for preventing reactivity within channels of an inkjet device that may store or house the two or more inks. The reactive ink system may also include a purge ink that may remove residual radicals from the channels of the ink jet device after mixing and jetting of the ink mixtures.

In embodiments, described is an ink set comprising at least two inks, wherein a first ink includes a binder and a peroxide and is free of peroxide decomposition agents, and wherein a second ink includes a binder and a peroxide decomposition agent and is free of peroxides.

In further embodiments, described is a method for forming an image with an ink set comprising at least two inks, wherein a first ink includes a binder and a peroxide and is free of peroxide decomposition agents, wherein a second ink includes a binder and a peroxide decomposition agent and is free of peroxides. The method includes providing the ink set to an ink jet device with an ink jet head and mixing the first and second inks before or during jetting, and jetting the first and second inks with the ink jet head onto a substrate, wherein the peroxide and the peroxide decomposition agent initiate a reaction of the binder of the first and second ink to form a hard, solid ink image on the substrate.

In yet further embodiments, described is an ink jet system comprising: an ink set comprising at least two inks, wherein a first ink includes a binder and a peroxide and is free of peroxide decomposition agents, wherein a second ink includes a binder and a peroxide decomposition agent and is free of peroxides. Further, the ink jet system has an ink jet device that includes at least two channels, wherein the first ink is located in a first channel and the second ink is located in a second channel, wherein the first and second inks are jettable from the channels via an ink jet head of the ink jet device, and wherein the first and second inks combine inside or outside the ink jet device.

EMBODIMENTS

The reactive ink components may include two or more inks that mix or combine to initiate the rapid, predictable and controllable radical polymerization, reaction to transform at least one binder of the two or more inks into a hard, solid ink. After polymerization of one or more binders of the inks begins, the viscosity of the ink system may increase as the binders of the inks transform from inks into hard, solid ink. A first ink includes a first reactive component, such as peroxide, a second ink includes a second reactive component, such as a peroxide decomposition agent, and an optional third ink includes an inhibition system and may be utilized as a purge ink.

Upon mixing of the first and second inks, the first and second reactive components react with each other. Thus, the first ink and the second ink must be stored or kept separately to prevent premature reacting between the first and second reactive components. The first and second inks may be mixed or combined together before or during jetting onto the substrate or on a substrate after jetting, so that the first and second reactive components may initiate the polymerization of the binder to form the hard, solid ink. The optional third ink may prohibit the initiation of the polymerization until the inhibition system has been used up via reaction with the reactive components.

The radical polymerization reaction or redox reaction of the binder may be initiated by a promotion of the first reactive component, such as a peroxide agent in the first ink, by the second reactive component, such as a peroxide decomposition agent in the second ink. The peroxide decomposition agent may be, for example, an amine or the like. The initiation by the peroxide decomposition agent may be referred to as the redox reaction initiation and may polymerize the binder of the inks to form the hard, solid ink.

The first ink, the second ink and the optional third ink refer to individual inks that are un-reacted. The inks may be mixed to form an ink set which has not initiated the radical polymerization reaction or the redox reaction of the binder in the inks. After the redox reaction is initiated by the first and second inks, polymerization of the binder of the irks occurs and the inks transform from inks to a hard, solid ink. The hard, solid ink may form images on a substrate that may be robust and may withstand stress from scratching and marring.

A first ink of the ink system may include a binder or ink vehicle, an optional colorant, an optional gellant and a first reactive component. A second ink of the ink system may include a binder or ink vehicle, an optional colorant, an optional gellant, and a second reactive component reactive with the first reactive component. The first ink should be free of the second reactive component, and the second ink should be free of the first reactive component. The third optional ink may include at least one inhibitor, a purge ink, a binder or ink vehicle, an optional colorant, and an optional gellant. When the third optional ink is not present, the first and/or second inks may include at least one inhibitor or a purge ink.

The binder or ink vehicle may also be referred to hereinafter as "vinyl monomer". Examples of a binder or ink vehicle suitable for the first ink, the second ink and the optional third ink include monomer compounds, such as acrylate, methacrylate, alkene, vinyl ether, allylic ether and mixtures thereof. Specific examples of monomers include, for example, isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, styrene, isoprene, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate and the like, as well as mixtures thereof. Examples of suitable multifunctional acrylate and methacrylate monomers and oligomers include pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris (2-hydroxy ethyl) isocyanurate triacrylate, SR9012 a trifunctional acrylate ester available from Sartomer Co. Inc, amine modified polyether acrylates (available as PO 83 F, LR 8869, and LR 8889 available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures thereof. In embodiments, the binder or ink vehicle may include, for example, tricyclodecane dimethanol diacrylate, nonyl methacrylate, lauryl diacrylate, 1,4-butanediol-diacrylate, 1,3-butylene glycol diacrylate, trimethylolpropane triacrylate, ethoxylated lauryl acrylate, polyethylene glycol diacrylate, 2-(2-ethoxyethoxy)ethyl acrylate, ethoxylated nonyl phenol methacrylate, and phenoxyethyl methacrylate, glyceryl triacrylate, epoxy aclylate, triacrylate, alkoxylated tetrahydrofurfuryl acrylate, urethane acrylate and urethane methacrylate. In other embodiments, the binder or ink vehicle may include monomers, such as propylene glycol monomethacrylate and the like.

The binder or ink vehicle may be present in the ink mixtures, that is, in the first ink, the second ink or the optional third ink, in any desired or effective amount, in one embodiment from about 0.1 percent by weight to about 98 percent by weight of the ink, such as from about 50 percent by weight to about 98 percent by weight of the ink or from about 70 percent by weight to about 95 percent by weight of the ink.

One or more organic peroxides may provided for efficient and substantial promotion of the redox reaction by the peroxide decomposition agent of the second ink for redox initiation. For example, use of one or more organic peroxides as the peroxide of the first ink may provide a more efficient amine promotion for the redox reaction as compared with use of non-organic peroxides as the peroxide of the first ink. Thus, the ink system may be formed and polymerization thereof may be initiated to form a hard, solid ink.

The first reactive component of the first ink may be a peroxide which upon activation will act as an initiator. Suitable peroxides or initiators for the first ink of the ink system may be in amounts of, for example, from about 0.1 to about 20% weight of the first ink. The peroxide of the first ink may be, for example, an organic peroxide, t-butyl hydroperoxide or cumene hydroperoxide. The peroxides or initiators of the first ink may include hydroperoxides such as, for example, t-butyl hydroperoxide, 2,5-dihydroperoxy-2,5-dimethylhexane, cumene hydroperoxide, and t-amyl hydroperoxide, acyl peroxides such as benzoyl peroxide, alkyl peroxides such as, for example, dicumyl peroxide, 2,5-dimethyl-2,5-di(t-butylperoxy)hexane, t-butyl-α-cumyl peroxide, α-α-bis(t-butylperoxy)diisopropyl benzene, di-t-butyl peroxide, t-amyl peroxide, and 2,5-dimethyl-2,5-di(t-butylperoxy)hexyne-3, peroxyesters such as, for example, t-amylperoxyacetate, t-butylperoxybenzoate, t-amylperoxybenzoate, t-butylperoxyacetate, OO-t-butyl-O-(2-ethylhexyl)monoperoxycarbonate, and OO-t-amyl-O-(2-ethyl hexyl)nonoperoxycarbonate, OO-t-butyl-O-isopropylmonoperoxycarbonate, and alkyl peroxyketals such as, for example, 2,2-di(t-amylperoxy)propane, n-butyl-4,4-bis(t-butylperoxy)valerate, 1,1-di(t-butylperoxy)-3,3,5-trimethylcyclohexane, 1,1-di(t-butyl)peroxycyclohexane, 1,1-di(t-amylperoxy)cyclohexane, 2,2-di(t-butylperoxy)butane, ethyl 3,3-di(t-butylperoxy)butyrate ethyl 3,3-di(t-amylperoxy)butyrate and the like.

The first reactive component of the second ink may be an amine or cobalt salt which promotes the peroxide of the first ink to act as an initiator. Suitable amines or promoters for the second ink of the ink system may be in amounts of, for example, from about 0.1 to about 20% weight of the ink. The peroxide of the first ink may be, for example, N,N-dimethyl-p-toluidine, N,N-dimethylaniline, N-(2-hydroxyethyl)-N'-methyl-p-toluidine, N,N-di(2-hydroxypropyl)-p-toluidine, N-(2-hydroxyethyl)-N-methylaniline, N,N-di(2-hydroxypropyl)-p-toluidine, ethyl-p-(dimethylamino)benzoate, 2-ethylhexyl-p-(dimethylamino)benzoate, a compound with amine functionality polyesters as found in U.S. Pat. No. 5,354,840 such as copoly[(4,4'-isopropylidenebisphenyl bispropanol bisether) N-phenyldiethanolamine/fumaric acid], copoly[(4,4'-isopropylidenebisphenyl bispropanol bisether) 2,6-dimethanol pyridine/adipic acid], polymerizable amines such as dimethylaminoethyl methacrylate, 2-hydroxy-3-dimethylaminopropyl methacrylate, 2-hydroxy-3-diethylaminopropyl methacrylate, N-acryl-N'-methylpiperazine, N-methacrylyl-N'-methylpiperazine, N—(N'-methylene-morpholino) acrylamide, N—(N'-methylene-morpholino) methacrylamide, N—(N',N'-dimethylaminophenyl)acrylamide, N—(N',N'-dimethylaminophenyl)methacrylamide, 4-dimethylaminobenzyl methacrylate, N,N-di(methacryloyloxy-1,2-propyl)-p-toluidine, N-methacryloyloxy-1,2-ethyl-N-methyl aniline, and the like.

The first, second and optional third inks of the ink system may each optionally contain one or more colorants, for example, from 1 to about 10, such as from 1 to about 4 or from 1 to about 2 colorants. The colorants may be present in the first, second and optional third inks in any desired amount, typically from about 0.5 to about 20 percent by weight of the first ink, such as from about 1 to about 6 percent by weight of the first ink. In embodiments, one of the first ink and the second ink or both the first and second inks may not include a colorant. As a result, at least one of the first ink and the second ink may be clear or transparent.

Examples of optional colorants that may be included in the first ink include pigments, dyes, mixtures of pigments and dyes, mixtures of pigments, mixtures of dyes, and the like. Any dye or pigment may be chosen, provided that it is capable of being dispersed or dissolved in the first ink and is compatible with the other ink components.

Examples of suitable pigments include, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300) (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA4 Magenta (DU PONT), PALIOGEN Black L0084 (BASF); Pigment Black K801 (BASF); and carbon blacks such as REGAL, 330™ (Cabot), Carbon Black 5250, Carbon Black 5750 (Columbia Chemical), mixtures thereof and the like.

Examples of suitable dyes include Usharect Blue 86 (Direct Blue 86), available from Ushanti Color; Intralite Turquoise 8GL, (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine available from Metrochem Industries; Cartasol Yellow 6GF Clariant; Carta Blue 2GL, available from Clariant; and the like.

In embodiments, solvent dyes may be utilized. Examples of solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL, (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 2195] (BASF), Sudan Blue 670 [C.I. 61554] (BASF), Sudan Yellow 146 [C.I. 12700] (BASF), Sudan Red 462 [C.I. 260501] (BASF) and the like.

In embodiments, suitable colorants for the first, second and optional third inks of the ink system may be selected from those disclosed in U.S. Pat. No. 6,726,755, U.S. Pat. No. 6,663,703, U.S. Pat. No. 6,860,931, U.S. Pat. No. 6,835,238, U.S. Pat. No. 6,958,406 and U.S. Pat. No. 6,821,327, each of which is incorporated in its entirety herein by reference.

Two or more of the inks may combine and initiate a reaction of a binder to transform into a hard, solid ink to form a visible image or a clear ink coating. If the two or more inks combine to initiate the reaction of the binder to form a visible image, at least one ink of the ink set should include a colorant. If the two or more inks combine to initiate the reaction of the binder to form a clear ink coating, such as an overcoat, the inks of the ink set may not contain a colorant. If the two or more inks combine to initiate the reaction of the binder to form an undercoat, the inks of the ink set may or may not contain a colorant.

The ink system may further include known optional additives to take advantage of the known functionality associated with such known additives. Such optional additives may include, for example, viscosity modifiers, antioxidants, UV absorbers, gellants and the like.

The optional viscosity modifier may be (1) 2-hydroxybenzyl alcohol, (2) 4-hydroxybenzyl alcohol, (3) 4-nitrobenzyl alcohol, (4) 4-Hydroxy-3-methoxy benzyl alcohol, (5) 3-methoxy-4-nitrobenzyl alcohol, (6) 2-amino-5-chlorobenzyl alcohol, (7) 2-amino-5-methylbenzyl alcohol, (8) 3-amino-2-methylbenzyl alcohol, (9) 3-amino-4-methyl benzyl alcohol, (10) 2(2-(aminomethyl)phenylthio) benzyl alcohol, (11) 2,4,6-trimethylbenzyl alcohol, (12) 2-amino-2-ethyl-1,3-propanediol, (13) 2-amino-1-phenyl-1,3-propanediol, (14) 2,2-dimethyl-1-phenyl-1,3-propanediol, (15) 2-bromo-2-nitro-1,3-propanediol, (16) 3-tert-butylamino-1,2-propanediol, (17) 1,1-diphenyl-1,2-propanediol, (18) 1,4-dibromo-2,3-butanediol, (19) 2,3-dibromo-1,4-butanediol, (20) 2,3-dibromo-2-butene-1,4-diol, (21) 1,1,2-triphenyl-1,2-ethanediol, (22) 2-naphthalenemethanol, (23) 2-methoxy-1-naphthalenemethanol, (24) decafluoro benzhydrol, (25) 2-methylbenzhydrol, (26) 1-benzeneethanol, (27) 4,4'-isopropylidene bis(2-(2,6-dibromo phenoxy)ethanol), (28) 2,2'-(1,4-phenylenedioxy)diethanol, (29) 2,2-bis (hydroxymethyl)-2,2',2"-nitrilotriethanol, (30) di(trimethylolpropane), (31) 2-amino-3-phenyl-1-propanol, (32) tricyclohexylmethanol, (33) tris(hydroxymethyl)aminomethane succinate, (34) 4,4'-trimethylene bis(1-piperidine ethanol), (35) N-methyl glucamine, (36) xylitol, or mixtures thereof. When present, the viscosity modifier is present in the irk in any effective amount, such as from about 30 percent to about 55 percent by weight of the inks or from about 35 percent to about 50 percent by weight of the inks.

Optional antioxidants in the inks may protect the images from oxidation and also may protect the inks from oxidation.

Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12,840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis (trifluoromethyl)benzoic acid (Aldrich 32,527-9), (30) ethyl-2-(4-(4-(trifluoromethyl) phenoxy) phenoxy) propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), and the like, as well as mixtures thereof. The antioxidant, when present, may be present in the inks in any desired or effective amount, such as from about 0.25 percent to about 20 percent by weight of the inks or from about 1 percent to about 5 percent by weight of the inks.

The optional antioxidants may include an antioxidant stabilizer to protect the images from oxidation and may also protect the ink components from oxidation. Specific examples of suitable antioxidant stabilizers include, for example, NAUGARD® 524, NAUGARD® 635, NAUGARD® A, NAUGARD® 1-403, and NAUGARD® 959, commercially available from Crompton Corporation, Middlebury, Conn.; NAUGARD® 76, NAUGARD® 445, and NAUGARD® 512 commercially available by Uniroyal Chemical Company; IRGANOX® 1010 and IRGASTAB® UV 10, commercially available from Ciba Specialty Chemicals; GENORAD 16 and GENORAD 40 commercially available from Rahn AG, Zurich, Switzerland, and the like, as well as mixtures thereof.

The inks can also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetopbenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethlyipiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetrame-thyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2, 4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV Chek AM-105 from Ferro), (24) 2-amino-2',5-dichlorobenzophenone Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino) benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof. When present, the optional UV absorber may be present in the inks in any desired or effective amount, such as from about 1 percent to about 10 percent by weight of the inks or from about 3 percent to about 5 percent by weight of the inks.

In embodiments, at least one of the first ink and second ink may include the acrylate, methacrylate, vinyl ether and other radical polymerizable compounds to form a curable ink having at least one binder or ink vehicle that may be present in an amount from about 0.1% to about 98% by weight of the first and second inks.

The second ink of the ink system may include a binder or ink vehicle, an optional colorant and a peroxide decomposition agent. The binder or ink vehicle of the second ink may be the same as or different from the binder or ink vehicle of the first ink. The optional colorant of the second ink may be the same as or different from the colorant of the first ink and the optional third ink. The binder or ink vehicle and the optional colorant may be present in the second ink in similar or same amounts as the binder or ink vehicle and the colorant of the first ink. In embodiments, the second ink may include optional additives, such as, biocides, viscosity modifiers, antioxidants, UV absorbers, UV curable compounds or gellants. The optional additives of the second ink may be the same as or different from the optional additives of the first ink. The optional additives may be present in the second ink in similar or same amounts as the optional additives of the first ink.

The peroxide decomposition agent of the second ink is reactive with the peroxide of the first ink. The peroxide decomposition agent of the second ink may be, for example, an amine, a metal salt or the like. The amine of the second ink may include, for example, 2-ethylhexyl-4-(dimethylamino) benzoate. The peroxide decomposition agent may be present in the second ink in an amount similar to or the same as the amount of peroxide in the first ink. The peroxide decomposition agent and the peroxide may mix or combine to polymerize the binder or ink vehicles of the first ink and second ink to form a hard, solid ink. The ink system may be referred to as an amine-peroxide system when the peroxide decomposition agent is an amine. In embodiments, when the peroxide decomposition agent is cobalt napthalate or a metal salt, the ink system may be referred to as a cobalt napthalate-peroxide system or a salt-peroxide system, respectively. The peroxide decomposition agent may be present in equal molar amounts with the peroxide or optionally at higher or lower amounts with the peroxide. Higher amounts may increase the reaction time, although kinetic studies may indicate that the reaction is not very sensitive to amine concentration. Lower amounts than equimolar may be more preferred since the amine may be regenerated to react once again with a peroxide. Additionally, metal salts may be present in only catalytic amounts, since the metal salts may also react again with a peroxide.

As the amine, tertiary amines are known to promote decomposition of peroxides to provide at least one reactive free radical species, allowing polymerization initiation at temperatures at which peroxides are normally inactive. Benzoyl peroxide by itself may have a half-life of about 62 minutes at about 90° C. Moreover, t-butyl hydroperoxide may have about a 1-hour half life at about 200° C. As a result, a peroxide, such as t-butyl hydroperoxide, has a high half life to thermal initiation for the redox reaction. For example, t-butyl hydroperoxide may have about a 10 hour half life of about 172° C. The redox initiator for the redox reaction may be thermally stable for a range of temperatures from about ambient temperature, about 25° C. to about 90° C.

Additionally, a functionality of the peroxide decomposition agent, such as a compound with amine functionality or the like may be incorporated into an oligomer to provide a lower rate of diffusion for the peroxide decomposition agent is desired. Thus, amine promotion may occur at a rate that substantially corresponds to the lower rate of diffusion of the peroxide decomposition agent. As a result, the redox initiation may occur at a range of temperatures from about ambient temperature to about 90° C.

A polyester backbone into which the compound with amine functionality may be incorporated may be prepared by reacting at least a first monomer and a second monomer to form a polyester having a first and second residues derived from the first and second monomers, respectively.

Polyester backbones incorporating the compound with amine functionality have low molecular weight condensation polymers which may be formed by a step-wise reaction between a first monomer and a second monomer. Amine polyesters may be selected in various effective amounts, such as from about 1 to about 15 percent by weight, specifically from about 1 to about 10 percent by weight and more specifically from about 1 to about 5 percent by weight. The amine contained in the polyester may be present in small amounts as indicated herein, such as for example from about 1 to about 5 percent in embodiments. The amine polyesters may include low molecular weight condensation polymers which may be formed by the step-wise reactions between both saturated and unsaturated diacids (or anhydrides) and dihydric alcohols (glycols or diols) and diol amines sometimes known as alkanolamines. The resulting polymer may be a saturated or unsaturated polyester.

The first monomer may be selected among both saturated and unsaturated diacids or anhydrides. The second monomer may include a dihydric alcohol, such as glycol or diol. The resulting saturated or unsaturated polyesters may be reactive or cross-linkable on at least three fronts: (a) unsaturation sites or double bonds along the polyester chain, if unsaturated, (b) the compound with an amine functionality group, and (c) functional groups other than the compound with an amine functionality group, amendable to reaction, for example, an acid-base reaction in the polyester backbone, such as, carboxyl, hydroxy and the like.

The cobalt source may include one or more metallic cobalts, salts of cobalt, complexes and organometallic compounds containing cobalt. Specific examples of suitable cobalt sources may include cobalt sulfate, cobalt bromide, cobalt chloride, cobalt fluoride, cobalt iodide, cobalt nitrate, cobalt stearate, cobalt carbonate, cobalt naphthalate, cobalt (II) hydroxide, cobalt (II) phosphate, cobalt (III) fluoride, cobaltous acetate, cobalt (II) acetylacetonate, cobalt (II) benzoylacetonate, cobalt (III) acetylacetonate, and cobalt (III) hexafluoroacetylacetonate, aid combinations thereof. In embodiments, salts of Fe, Mn, V, Cu and the like may be used.

While not being desired to be limited by theory, it is believed that the initiation reaction mechanism of a redox reaction for the amine-peroxide system to polymerize the binder of the first and second inks may be similar to that proposed originally by Horner in J. Polym. Sci., 18, 438, 1955, and enlarged upon by Feng and Sun in Makromol. Chem., Macromol. Symp. 63, 1 to 18 (1992). It is summarized in the scheme below where $R_1$ and $R_2$ represent the polymer chains into which the amine moiety is incorporated. In embodiments, the amine may be 2-ethylhexyl-4-(dimethylamino)benzoate or the like. The t-butoxy free radical is expected to then react with the acrylic, methacrylic or other vinyl groups in the ink to form a hard, solid ink.

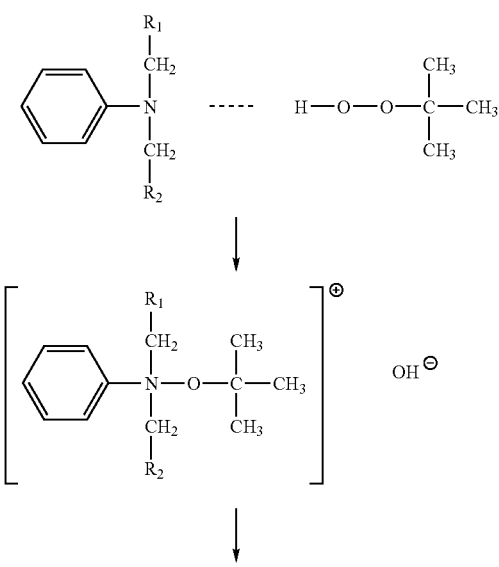

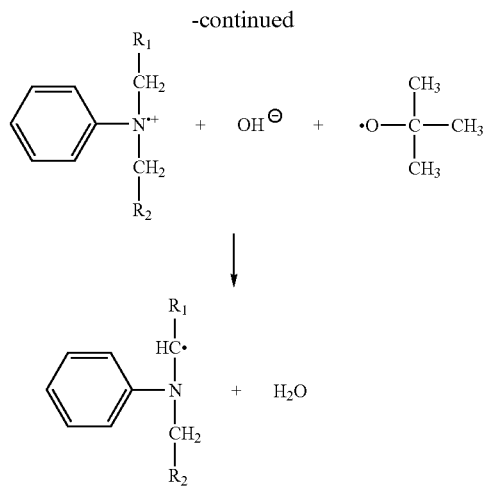

The concentration of the peroxide agent and the peroxide decomposition agent in the inks may be controlled to provide an induction period to the initiation of the redox reaction. A mobility of the peroxide decomposition agent may be manipulated by increasing a size or a bulk of the peroxide decomposition agent within the second ink. The size or bulk associated with the peroxide decomposition agent may control a rate of reaction for the polymerization of the binder or ink vehicles. As the size or bulk of the peroxide decomposition agent may increase, the rate of reaction of the initiation may decrease because the bulk may prevent a portion of the peroxide decomposition agent from reacting with the peroxide. Increasing a bulk or size of the peroxide decomposition agent may prevent the redox initiation from immediately occurring after mixing the inks. As a result, the bulk or size of the peroxide decomposition agent may provide an induction period to prevent polymerization of the vinylic groups within the inks from immediately occurring upon mixing or combining the inks. The oligimerization of suitable tertiary amines may provide ready examples of diffusion limited promoting agents.

The optional third ink may include a binder or ink vehicle, an optional colorant and one or more inhibitors. The binder or ink vehicle of the optional third ink may be the same as or different from the binder or ink vehicle of the first or second inks. The optional colorant of the optional third ink may be the same as or different from the colorant of the first or second inks. The binder or ink vehicle and the optional colorant may be present in the optional third ink in similar or same amounts as the binder or ink vehicle and the colorant of the first or second inks. In embodiments, the optional third ink may include optional additives, such as biocides, viscosity modifiers, antioxidants, UV absorbers, UV curable compounds or gellants. The optional additives of the optional third ink may be the same as or different from the optional additives of the first or second inks. The optional additives may be present in the optional third ink in similar or same amounts as the optional additives of the first or second ink. The optional third ink may or may not include a peroxide or a peroxide decomposition agent. The optional third ink may be a non-reactive material.

A first inhibition system may be included within the optional third ink to inhibit the redox reaction between the first and second inks. The first inhibition system may include a free radical inhibitor, such as methylether hydroquinone, t-butylhydroquinone, hydroquinone, 2,5-di-1-butylhydroquinone, 2,6-di-1-butyl-4-methylphenol, 2,6-di-t-butyl-4-methoxyphenol and the like. The first inhibition system may be in an amount, such as from about 0.01% to about 10% by weight of the optional third ink, specifically from abut 0.05% to about 5% by weight of the optional third ink, and more specifically from about 0.1% to about 2% by weight of the optional third ink to control the redox reaction of the binder within the inks. An amount of the first inhibition system within the optional third ink may be increased such that the redox reaction and polymerization may be terminated prior to completion of the reaction or during the reaction. The amount of the first inhibition system that may be required to terminate the polymerization of the binders within the first and second inks may be less than about 25% of the second initiator system before the beginning of the polymerization of the vinylic groups. Mixing the first inhibition system with the first and second inks may reduce the rate of reaction or may stop the polymerization of the binder within the inks by prohibiting reaction between the first and second inks. Nitroxides, well known as free radical traps may be used as inhibitors, such as proxyl (2,2,5,5-tetramethyl-1-pyrrolidinyloxy), 3-carboxyl-proxyl, 3-carbamoyl-proxyl, 2,2-dimethyl-4,5-cyclohexyl-proxyl, 3-oxo-proxyl, 3-hydroxylimine-proxyl, 3-aminomethyl-proxyl, 3-methoxy-proxyl, 3-t-butyl-proxyl, 3-maleimido-proxyl, 3,4-di-t-butyl-proxyl, 3'-carboxylic-2,2,5,5-tetramethyl-1-pyrrolidinyloxy and the like, and derivatives thereof; and TEMPO (2,2,6,6-tetramethyl-1-piperidinyloxy), 4-benzoxyloxy-TEMPO, 4-methoxy-TEMPO, 4-carboxylic-4-amino-TEMPO, 4-chloro-TEMPO, 4-hydroxylimine-TEMPO, 4-hydroxy-TEMPO, 4-oxo-TEMPO, 4-oxo-TEMPO-ethylene ketal, 4-amino-TEMPO, 2,2,6,6-tetraethyl-1-piperidinyloxy, 2,2,6-trimethyl-6-ethyl-1-piperidinyloxy and the like, and derivatives thereof; and dialkyl nitroxide radicals such as di-t-butyl nitroxide, diphenyl nitroxide, t-butyl-t-amyl nitroxide and the like, and derivatives thereof; and DOXYL (4,4-dimethyl-1-oxazolidinyloxy), 2-di-t-butyl-doxyl, 5-decane-doxyl, 2-cyclohexane-doxyl, and the like, and derivatives thereof; and 2,5-dimethyl-3,4-di carboxylic-pyrrole, 2,5-dimethyl-3,4-diethylester-pyrrole, 2,3,4,5-tetraphenyl-pyrrole and the like; and 3-cyano-pyrroline-3-carbamoyl-pyrroline, 3-carboxylic-pyrroline and the like; 1,1,3,3-tetramethylisoindolin-2-yloxyl and 1,1,3,3-tetraethylisoindolin-2-yloxyl and the like; porphyrexide nitroxyl radicals such as 5-cyclohexyl porphyrexide nitroxyl and 2,2,4,5,5-pentamethyl-D3-imidazoline-3-oxide-1-oxyl and the like, and galvinoxyl and the like; 1,3,3,Ä trimethyl-2-azabicyclo[2,2,2]octane-5-oxide-2-oxide and 1Ä azabicyclo[3,3,1]nonane-2-oxide and the like; and with TEMPO being preferred. These stable free radical agent materials are known in the literature, for example in G. Moad et al., Tetrahedron Letters, 22, 1165 (1981), as free radical polymerization inhibitors. Optionally many commercial antioxidant stabilizers function by trapping free radicals and thus may be used as inhibitors. Indeed, Irgastab UV 10 is a nitroxide. Suitable compounds may include, for example, NAUGARD® 524, NAUGARD® 635, NAUGARD® A. NAUGARD® 1-403, and NAUGARD® 959, commercially available from Crompton Corporation, Middlebury, Conn.; NAUGARD® 76. NAUGARD® 445, and NAUGARD® 512 commercially available by Uniroyal Chemical Company; IRGANOX® 1010 and IRGASTAB® UV 10, commercially available from Ciba Specialty Chemicals; GENORAD 16 and GENORAD 40 commercially available from Rahn A G, Zurich, Switzerland, and the like, as well as mixtures thereof.

The amount of the first inhibitor system in the optional third ink may be about equimolar to or greater than the concentration of radicals produced by the peroxide. Often this is two moles of the first inhibition system per peroxide. For example, a temperature driven homolytic cleavage of benzoyl peroxide may provide two reactive radicals. However, the mechanisms on redox initiation may produce only one reactive radical per peroxide.

The most effective first inhibition system may be free radical traps, such as the nitroxides. As a result, a stable free radical may exist and the reaction with a peroxide sourced free radical may be about instantaneous with little or no activation barrier. The inhibitor and peroxide radical reactive may be irreversibly in these conditions and may from a stable compound. The reaction between the inhibitor and the peroxide radical reactive may be a more rapid reaction than a reaction of a peroxide sourced free radical with, for example, an activated carbon-carbon double (vinyl) bond. In this latter case, electrons may be in a pi-pi bond and may require some activation energy and a correct molecular orientation for the reaction to proceed. In the presence of an effective radical trap, polymerization may not proceed until the supply of the trap may be exhausted.

The amount of first inhibition system of the optional third ink may be high enough to prohibit reaction between the inks of the ink system, such that the ink system may maintain a viscosity for jetting onto an intermediate transfer member or the substrate. As a result, the ink system may be jetted onto the substrate prior to the initiation of the polymerization of the binder by the first and second inks of the ink system.

A second inhibition system, along with the first inhibition system, may also be included within the optional third ink to inhibit the redox reaction from being initiated by the inks when mixing the first and second ink. In alternative embodiments, the second inhibition system may be used without the first inhibition system. The second inhibition system may be mixed with the first and second inks to delay initiation of the redox reaction between by the binder. After mixing the second inhibition system with the inks, the second inhibition system may be reacted with the inks and utilized by the inks. After the second inhibition system has reacted with the inks and no second inhibition system remains, the inks react to initiate the redox reaction of the binder.

The second inhibition system may include a free radical inhibitor, such as 4-hydroxy-2,2,6,6-tetramethyl-1-piperidinyloxy free radical, hydroxyTEMPO or the like. In embodiments, the second inhibition system may be in an amount that is equal to or greater than the amount of peroxide in first ink. For example, the chemical structure for hydroxyTEMPO may be as follows:

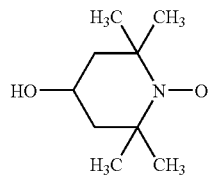

The second inhibition system nay be in an amount from about 0.01% to about 10% by weight of the ink. The second inhibition system may be in an amount from about 0.05% to 1% by weight of the optional third ink to control the redox reaction between the inks.

An acrylate within at least one of the first, second or optional third inks may react with the free radical inhibitor of the second inhibition system. After the tree radical inhibitor of the second inhibition system has reacted with the acrylate of at least one of the first, second or optional third inks, the second inhibition system may not contain any free radical inhibitor. As a result, the redox reaction of the binder may be initiated by the first and second inks. For example, the first inhibition system may have been injected into a mixing area of the ink jetting device and utilized to terminate the reaction. To subsequently initiate the redox initiation reaction, the first inhibition system may have to be purged from the mixing area of the ink jetting device with, for example, the first and second inks. Alternatively, a voltage may be applied directly or adjacently to the first inhibition system within the ink jetting device and the first and second inks entering the mixing area may eject the first inhibition system from the ink jetting device. Without the first or second inhibition systems present, the first and second inks may mix and initiate the redox reaction to begin polymerization of the binder.

By loading at least one of the inks with the first or second inhibition system, an induction period may be provided so that polymerization of the vinyl monomer (binder) within the inks does not occur immediately upon mixing or combining of the inks. As a result, the induction period for the redox reaction may prevent formation of the hard, solid ink or may prevent radical polymerization from occurring within the ink jetting device or prior to jetting onto the substrate.

The inks may be mixed to form the ink system within the ink jetting device. In such embodiments, the redox reaction and the polymerization of the vinyl monomer may begin to from the hard, solid ink. The ink system prior to polymerization to a hard, solid ink may be jetted from the ink jet head onto the substrate. After combination or mixing of the inks and polymerization of the vinyl monomer of the first and second inks to form the hard, solid ink, residual radicals or compounds may remain in the ink jetting device. The optional third ink may include the second inhibition system, which may react with the residual compounds or radicals left behind within the ink jetting device to purge the compounds or radicals therefrom. By purging the compounds and radicals from the device, the optional third ink prevents the compounds and radicals from polymerizing and forming hard, solid ink that may clog any portion of the ink jetting device. In embodiments, a separate purge ink may pass through the ink jet head to remove the residual radicals or compounds from the ink jetting device prior to the subsequent jetting of additional inks. In further embodiments, the first or second ink may pass through the ink jet head to remove and purge the residual radicals or compounds therefrom.

The peroxide of the first ink and the peroxide decomposition agent of the second ink may be selected to be stable at jetting temperatures, for example, up to about 100° C., such as from about 35° C. to about 50° C. (with gellants included in at least one ink), or from about 50° C. to about 80° C. (without gellants included in the inks). At least one of the first, second and optional third inks may be mixed or combined before, during or after jetting the inks onto a substrate to form an image or coating. In the absence of gellants, it may not be necessary to have a jetting temperature higher than about 50° C. As a result, peroxides with lower temperature half lives may be suitable for the first ink.

In embodiments, the first, second or optional third inks may be mixed or combined inside the ink jetting device to form the ink system before the ink system is jetted onto an intermediate transfer member or final substrate. The optional third ink may have an amount of the first inhibition system and an amount of the second inhibition system that may be reacted with the inks to prohibit the polymerization of the vinyl monomer in the inks within the ink jet head. After the amount of the second inhibition system is reacted with the inks and no second inhibition system remains, the redox reaction may be initiated by the inks and the polymerization of the vinyl monomer may begin as the inks are jetted from the ink jet head. As a result, the redox reaction and the polymerization of the vinyl monomer may not occur as the inks are jetted from the device to form the hard, solid ink.

In further embodiments, the inks may be mixed or combined anywhere between exiting the ink jet head of the ink jetting device and the substrate, that is, anywhere in flight. The first and second inhibition systems of the inks may prohibit the redox reaction from beginning until after the second inhibition system has reacted with the inks. After combination of the inks between the ink jetting device and the substrate, the droplets of the inks may begin to react, that is polymerization of the vinyl monomer may begin and momentum of the droplets may carrier the droplets to a desired location on the substrate. As a result, the ink system is formed between the ink jetting device and the substrate or outside the ink jetting device. Mixing or combining the inks during transferring involves ejecting droplets of the inks so that the droplets of the inks collide and mix in flight between the ink jetting device and the substrate. The ink jet head may be configured to separately jet each of the inks so that the inks combine upon being jetted. While in flight, the polymerization of the vinyl monomer in the inks may form the hard, solid ink before the droplets collide with the substrate.

In yet still further embodiments, the redox reaction and the polymerization may not begin until the inks have contacted or been transferred to the final substrate or the intermediate transfer member. For example, the droplets may not collide or mix to form the ink system until the droplets contact or are positioned on the final substrate or intermediate transfer member. The inks may be ejected from the ink jetting device to a desired location on the substrate or the intermediate transfer member, and the ink system may be formed thereon. The polymerization of the vinyl monomer in the inks may begin after any first and second inhibition systems in the inks react with the inks. As a result, the redox reaction may be initiated by the inks on the substrate or intermediate transfer member to form the hard, solid ink thereon.

By mixing the inks outside of the ink jet head, no residual compounds or radicals are left within the ink jetting device. As a result, purging of the residual radicals or compounds from the ink jetting device may not be required. Thus, the inks may not be required to have a purge ink to remove or purge the residual radicals or compounds from the ink jetting device. Moreover, the ink jetting device may not be required to have a purge ink to remove the residual radicals or compounds.

A ink jetting device suitable for use herein may have different channels or reservoirs for storing and maintaining separation of the first, second and optional third inks. At least one of the inks may be stored separately to prevent the redox reaction between any of the inks from occurring prematurely. If the inks are mixed prior to being jetted from the ink jetting device and no first or second inhibition systems are present, the redox reaction of the inks may begin immediately and polymerization of the vinyl monomer in the inks may occur to transform the inks to a hard, solid ink. Transforming the inks to a hard, solid ink prior to jetting of the inks from the ink jetting device may clog or damage the ink jet head or ink jetting device, such as the ink jet head. The ink jetting device may alternatively be configured to mix or to combine each of the inks from the different and separate reservoirs within the device before the ink jet head.

The first, second and optional third inks may each be housed or stored in a different channel or reservoir within the device. The ink jetting device may have channels or reservoirs for each of the colors, such as black, cyan, magenta, and yellow.

At least one ink jet head of the device may eject or print the droplets of the ink system onto the substrate. The at least one print head may include multiple arrays of ejectors for ejecting one or more drops of the inks. The array of ejectors may mix or combine the inks and may provide rapid mixing of the inks. In embodiments, the ink jetting device may be a microreactor system to provide rapid mixing of the inks so that the mixing occurs faster than with a conventional batch reactor.

In embodiments, the ink combinations may be in a gel-like state in the temperature range used for transfuse. Under these conditions, the ink combinations can be fused to the substrate with low pile height and minimum showthrough. In another embodiment, the ink combinations may be in a gel-like state in the temperature range used for fusing or post-fusing the image. In another embodiment, the substrate onto which droplets of the inks are ejected in an imagewise pattern, whether it is the substrate (in a direct printing process) or an intermediate transfer member (in an indirect printing process), is maintained at a temperature at which the ink combinations are in the gel state, i.e., at a temperature below the onset of gelation when cooling from the a liquid state. Without being limited to any specific theory, it is believed that in this embodiment, the substrate temperature (either the final substrate or the intermediate transfer member) is set at an optimum temperature for the formation of a reinforcing gel network. It is believed that the image thus formed will have improved robustness as a result of the reinforcement of the vinyl monomer with the gel. Upon cooling or, in the case of an indirect printing method, transfer to the substrate, the network may be frozen within the vinyl monomer.

The inks disclosed herein may each be included in at least one channel or reservoir connected by any suitable feeding device to one or more ejecting channels and orifices of the ink jet head for ejecting the droplets of the inks. "At least one" or "one or more" as used to describe components of the ink jet device, such as the ejecting channels, orifices, etc., refers to from 1 to about 2 million, such as from about 1000 to about 1.5 million or about 10,000 to about 1 million of any such component found in the ink jet device. "At least one" or "one or more" as used to describe other components of the ink jet device such as the ink jet head, reservoir, feeder, etc., refers to from 1 to about 15, such as from 1 to about 8 or from 1 to about 4 of any such component found in the ink jet device.

By permitting the polymerization of the vinyl monomer of the inks to begin outside the ink jet head or on the substrate, the ink system, in non-solid form, may be jetted onto the substrate. As a result, a larger duration for jetting the ink system onto the substrate may be provided by including the UV curable compounds having gel-like properties in the inks.

EXAMPLES

A first set of inks is combined to form a black ink as shown in Table 1. A second set of inks is combined to form a clear overcoat as shown in Table 2. The first set and the second set of inks include ink component A, ink component B and purge ink C. Ink component A has a first colorant and ink component B has a second colorant. In embodiments, ink components A and B are jetted or ejected to overlay each other for forming a color, a gloss, a coating or the like.

Ink component A includes a peroxide, (t-butyl hydroperoxide) and ink component B includes a peroxide decomposition agent, (2-ethylhexyl-4-(dimethylamino)benzoate). Purge ink C includes either or both C1, which is a first inhibition system (methylether hydroquinone), and C2, which is a second inhibition system using a free radical trap (4-hydroxy-2,2,6,6-tetramethyl-1-piperidinyloxy).

TABLE 1

| | Component (wt %) | | | |
|---|---|---|---|---|
| | A | B | C1 | C2 |
| propoxylated neopentyl glycol diacrylate | 77.01 | 77.41 | 77.91 | 78.11 |
| amide gellant | 7.5 | 7.5 | 7.5 | 7.5 |
| UNILIN 350-acrylate | 5 | 5 | 5 | 5 |
| NIPEX 150 carbon black pigment | 3 | 3 | 3 | 3 |
| SOLSPERSE 34750 | 6.29 | 6.29 | 6.29 | 6.29 |
| 2-ethylhexyl-4-(dimethylamino)benzoate | 1 | 0 | 0 | 0 |
| t-butyl hydroperoxide | 0 | 0.6 | 0 | 0 |
| methylether hydroquinone | 0 | 0 | 0.3 | 0 |
| 4-hydroxy-2,2,6,6-tetramethyl-1-piperidinyloxy, free radical | 0 | 0 | 0 | 0.1 |
| IRGASTRAB UV10 | 0.2 | 0.2 | 0 | 0 |
| Total | 100 | 100 | 100 | 100 |

TABLE 2

| | Component (wt %) | | | |
|---|---|---|---|---|
| | A | B | C1 | C2 |
| propoxylated neopentyl glycol diacrylate | 26 | 26.4 | 26.7 | 26.9 |
| tricyclodecane dimethanol diacrylate | 35 | 35 | 35 | 35 |
| dipentaerythritol pentacrulate | 10 | 10 | 10 | 10 |
| ethoxylated trimethylolpropane triacrylate | 8 | 8 | 8 | 8 |
| Aliphatic siliconized urethane diacrylate (Ebecryl 4842 ex Cytec) | 20 | 20 | 20 | 20 |
| 2-ethylhexyl-4-(dimethylamino)benzoate | 1 | 0 | 0 | 0 |
| t-butyl hydroperoxide | 0 | 0.6 | 0 | 0 |
| methylether hydroquinone | 0 | 0 | 0.3 | 0 |
| 4-hydroxy-2,2,6,6-tetramethyl-1-piperidinyloxy, free radical | 0 | 0 | 0 | 0.1 |
| Total | 100 | 100 | 100 | 100 |

The ink components A and B and purge ink C (including both C1 and C2) are combined and jetted onto a substrate to form hard, solid inks on the substrate. The first set and the second set of inks are jettable onto a substrate at about 80° C. Polymerization of the acrylate monomers or vinyl monomer components A and B and purge ink C occurs when the redox reaction is initiated by ink components A and B. As a result, a solid black ink or a solid clear overcoat is formed. In embodiments, the substrate may be made from, for example, paper, plastic, metal, ceramic, wood or the like.

The ink components A and B may be in approximately equal volume. In embodiments, the ink components A and B may be in a range of about 10 parts or less to about 90 parts more of the other ink. The reactivity of the ink components A and B may be governed by the relative stoichiometry of the peroxide of the ink component A and the promoting agent of the ink component B. Purge ink C may displace both ink components A and B, so purge ink C may be about 100 parts or more. The ink components A and B and purge ink C may be mixed in the jet head. Alternatively ink components A and B may be mixed while in flight between the jet head and the substrate or may be mixed upon impact on the substrate.

It will be appreciated that various of the above-disclosed and other features and function, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Unless specifically recited in the claim, steps or components of claims should not be implied or imported from the specification or any other claims as to any particular order, number, position size, shape, angle, color, or material.

What is claimed is:

1. An ink set comprising at least three inks, wherein:
   a first ink includes a binder and a peroxide and is free of peroxide decomposition agents,
   a second ink includes a binder and a peroxide decomposition agent and is free of peroxides, and
   a third ink includes an inhibitor and does not include peroxides or peroxide decomposition agents.

2. The ink set according to claim 1, wherein the peroxide of the first ink is t-butyl hydroperoxide, 2,5-dihydroperoxy-2,5-dimethylhexane, cumene hydroperoxide, t-amyl hydroperoxide, dicumyl peroxide, benzoyl peroxide, 2,5-dimethyl-2,5-di(t-butylperoxy)hexane, t-butyl-α-cumyl peroxide, α-α-bis (t-butylperoxy)diisopropyl benzene, di-t-butyl peroxide, t-amyl peroxide, 2,5-dimethyl-2,5-di(t-butylperoxy)hexyne-3, peroxyesters, t-amylperoxyacetate, t-butylperoxybenzoate, t-amylperoxybenzoate, t-butylperoxyacetate, OO=-t-butyl-O-(2-ethylhexyl)monoperoxycarbonate, OO-t-amyl-O-(2-ethyl hexyl)monoperoxycarbonate, OO-t-butyl-O-isopropylmonoperoxycarbonate, 2,2-di(t-amylperoxy) propane, n-butyl-4,4-bis(t-butylperoxy)valerate, 1,1-di(t-butylperoxy)-3,3,5-trimethylcyclohexane, 1,1-di(t-butyl) peroxycyclohexane, 1,1-di(t-amylperoxy)cyclohexane, 2,2-di(t-butylperoxy)butane, or ethyl 3,3-di(t-butylperoxy) butyrate ethyl 3,3-di(t-amylperoxy)butyrate.

3. The ink set according to claim 1, wherein the peroxide decomposition agent of the second ink is an amine, a metal naphthalate or a metal salt.

4. The ink set according to claim 3, wherein the amine is a tertiary amine.

5. The ink set according to claim 1, wherein the peroxide decomposition agent is a compound with amine functionality that is selected from one of copoly[(4,4'-isopropylidenebisphenyl bispropanol bisether) N-phenyldiethanolamine/fumaric acid], copoly[(4,4'-isopropylidenebisphenyl bispropanol bisether) 2,6-dimethanol pyridine/adipic acid], dimethylaminoethyl methacrylate, 2-hydroxy-3-dimethylaminopropyl methacrylate, 2-hydroxy-3-diethylaminopropyl methacrylate, N-acryl-N'-methylpiperazine, N-methacrylyl-N'-methylpiperazine, N—(N'-methylene-morpholino) acrylamide, N—(N'-methylene-morpholino) methacrylamide, N—(N',N'-dimethylaminophenyl)acrylamide, N—(N',N'-dimethylaminophenyl)methacrylamide, 4-dimethylaminobenzyl methacrylate, N,N-di(methacryloyloxy-1,2-propyl)-p-toluidine, N-methacryloyloxy-1,2-ethyl-N-methyl aniline and mixtures thereof.

6. The ink set according to claim 3, wherein the amine is a compound with amine functionality in a polyester backbone.

7. The ink set according to claim 1, wherein the peroxide of the first ink is in a range of from about 0.1% to about 20% weight of the first ink.

8. The ink set according to claim 1, wherein the first ink or the second ink includes an inhibitor.

9. The ink set according to claim 1, wherein one or more of the inks include at least one colorant.

10. The ink set according to claim 1, wherein the inhibitor is 4-hydroxy-2,2,6,6-tetramethyl-1-piperidinyloxy free radical, methyl ether hydroquinone, t-butylhydroquinone, hydroquinone, 2,5-di-t-butylhydroquinone, 2,6-di-t-butyl-4-methylphenol, or 2,6-di-t-butyl-4-methoxyphenol.

11. A method of forming an image with an ink set comprising at least three inks, wherein a first ink includes a binder and a peroxide and is free of peroxide decomposition agents, a second ink includes a binder and a peroxide decomposition agent and is free of peroxides, and a third ink includes an inhibitor and does not include peroxides or peroxide decomposition agents, the method comprising:

provjding the ink set to an ink jet device with an ink jet head; and mixing the first, second, and third inks before or during jetting, or on a substrate after jetting, and jetting the first, second, and third inks with the ink jet head onto the substrate, wherein the peroxide and the peroxide decomposition agent initiate a reaction of the binder of the first and second ink to form a hard, solid ink image on the substrate.

12. The method according to claim 11, wherein the peroxide of the first ink is t-butyl hydroperoxide, 2,5-dihydroperoxy-2,5-dimethylhexane, cumene hydroperoxide, t-amyl hydroperoxide, dicumyl peroxide, 2,5-dimethyl-2,5-di(t-butylperoxy)hexane, t-butyl-α-cumyl peroxide, benzoyl peroxide, α-α-bis(t-butylperoxy)diisopropyl benzene, di-t-butyl peroxide, t-amyl peroxide, 2,5-dimethyl-2,5-di(t-butylperoxy)hexyne-3, peroxyesters, t-amylperoxyacetate, t-butylperoxybenzoate, t-amylperoxybenzoate, t-butylperoxyacetate, OO-t-butyl-O-(2-ethylhexyl)monoperoxycarbonate, OO-t-amyl-O-(2-ethyl hexyl)monoperoxycarbonate, OO-t-butyl-O-isopropylmonoperoxycarbonate, 2,2-di(t-amylperoxy)propane, n-butyl-4,4-bis(t-butylperoxy)valerate, 1,1-di(t-butylperoxy)-3,3,5-trimethylcyclohexane, 1,1-di(t-butyl) peroxycyclohexane, 1,1-di(t-amylperoxy)cyclohexane, 2,2-di(t-butylperoxy)butane, or ethyl 3,3-di(t-butylperoxy)butyrate ethyl 3,3-di(t-amylperoxy)butyrate.

13. The method according to claim 11, wherein the peroxide decomposition agent of the second ink is an amine, a metal naphthalate or a metal salt.

14. The method according to claim 11, wherein the hard solid ink image is a colored ink, an overcoat or an undercoat.

15. The method according to claim 11, wherein one or more of the inks include at least one colorant.

16. An ink jet system comprising:

an ink set comprising at least three inks, wherein a first ink includes a binder and a peroxide and is free of peroxide decomposition agents, a second ink includes a binder and a peroxide decomposition agent and is free of peroxides, and a third ink includes an inhibitor or a free radical trap and does not include peroxides or peroxide decomposition agents; and an ink jet device including at least three channels, wherein the first ink is located in a first channel, the second ink is located in a second channel, and the third ink is located in a third channel, wherein the first, second, and third inks are jettable from an ink jet head of the ink jet device, and wherein the first, second, and third inks combine inside or outside the ink jet device.

17. The ink jet system according to claim 16, wherein the peroxide of the first ink is t-butyl hydroperoxide, 2,5-dihydroperoxy-2,5-dimethylhexane, cumene hydroperoxide, t-amyl hydroperoxide, dicumyl peroxide, benzoyl peroxide, 2,5-dimethyl-2,5-di(t-butylperoxy)hexane, t-butyl-α-cumyl peroxide, α-α-bis(t-butylperoxy)diisopropyl benzene, di-t-butyl peroxide, t-amyl peroxide, 2,5-dimethyl-2,5-di(t-butylperoxy)hexyne-3, peroxyesters, t-amylperoxyacetate, t-butylperoxybenzoate, t-amylperoxybenzoate, t-butylperoxyacetate, OO-t-butyl-O-(2-ethylhexyl)monoperoxycarbonate, OO-t-amyl-O-(2-ethyl hexyl)monoperoxycarbonate, OO-t-butyl-O-isopropylmonoperoxycarbonate, 2,2-di(t-amylperoxy)propane, n-butyl-4,4-bis(t-butylperoxy)valerate, 1,1-di(t-butylperoxy)-3,3,5-trimethylcyclohexane, 1,1-di(t-butyl)peroxycyclohexane, 1,1-di(t-amylperoxy)cyclohexane, 2,2-di(t-butylperoxy)butane, or ethyl 3,3-di(t-butylperoxy)butyrate ethyl 3,3-di(t-amylperoxy)butyrate.

18. The ink jet system according to claim 16, wherein the peroxide decomposition agent of the second ink is an amine, a metal naphthylate or a metal salt.

19. The ink jet system according to claim 16, wherein at least one of the inks include at least one colorant.

* * * * *